Feb. 14, 1939. R. S. KOPP Re. 21,004

AIR CONDITIONING SYSTEM

Original Filed April 9, 1936 2 Sheets-Sheet 1

INVENTOR
ROGER S. KOPP
BY Malcolm F. Barnett
ATTORNEY

Feb. 14, 1939. R. S. KOPP Re. 21,004

AIR CONDITIONING SYSTEM

Original Filed April 9, 1936 2 Sheets-Sheet 2

INVENTOR
ROGER S. KOPP
BY Malcolm F. Hammett
ATTORNEY

Reissued Feb. 14, 1939 Re. 21,004

UNITED STATES PATENT OFFICE 21,004

AIR CONDITIONING SYSTEM

Roger S. Kopp, York, Pa.,

Original No. 2,115,226, dated April 26, 1938, Serial No. 73,462, April 9, 1936. Application for reissue November 1, 1938, Serial No. 238,239

8 Claims. (Cl. 183—4)

This invention relates to air conditioning systems, and more particularly to such systems and apparatus which may be installed in transport vehicles, such as automobiles, busses, trucks, railroad cars, airplanes and the like. However, the invention may also be used for air conditioning any limited space within its capacity such as rooms of buildings, etc.

An object of the invention is to provide an improved air conditioning system of the absorption type, in which means are provided for positively circulating air within the area to be conditioned at variable velocities.

Another object of the invention is to provide an improved air conditioning system of the above type, in which the air is dehumidified by means of a rotatably mounted wheel of suitable anhydrous material.

Another object of the invention is to provide an air conditioning system of the above type with means for cooling the conditioned air.

Another object of the invention is to provide an air conditioning system of the above type with means for heating the conditioned air.

Another object of the invention is to provide an improved air conditioning system of the above type, in which the wheel of anhydrous material is caused to rotate only by means of moisture which is absorbed by a portion of the wheel at the point which unbalances the wheel.

Another object of the invention is to provide an improved air conditioning system of the character mentioned which is simple in construction and reliable and exact in function under all conditions of service.

The invention also comprises certain new and useful improvements in the construction, arrangement and combination of the several parts of which it is composed, as will be hereinafter more fully described and claimed.

Figure 1:
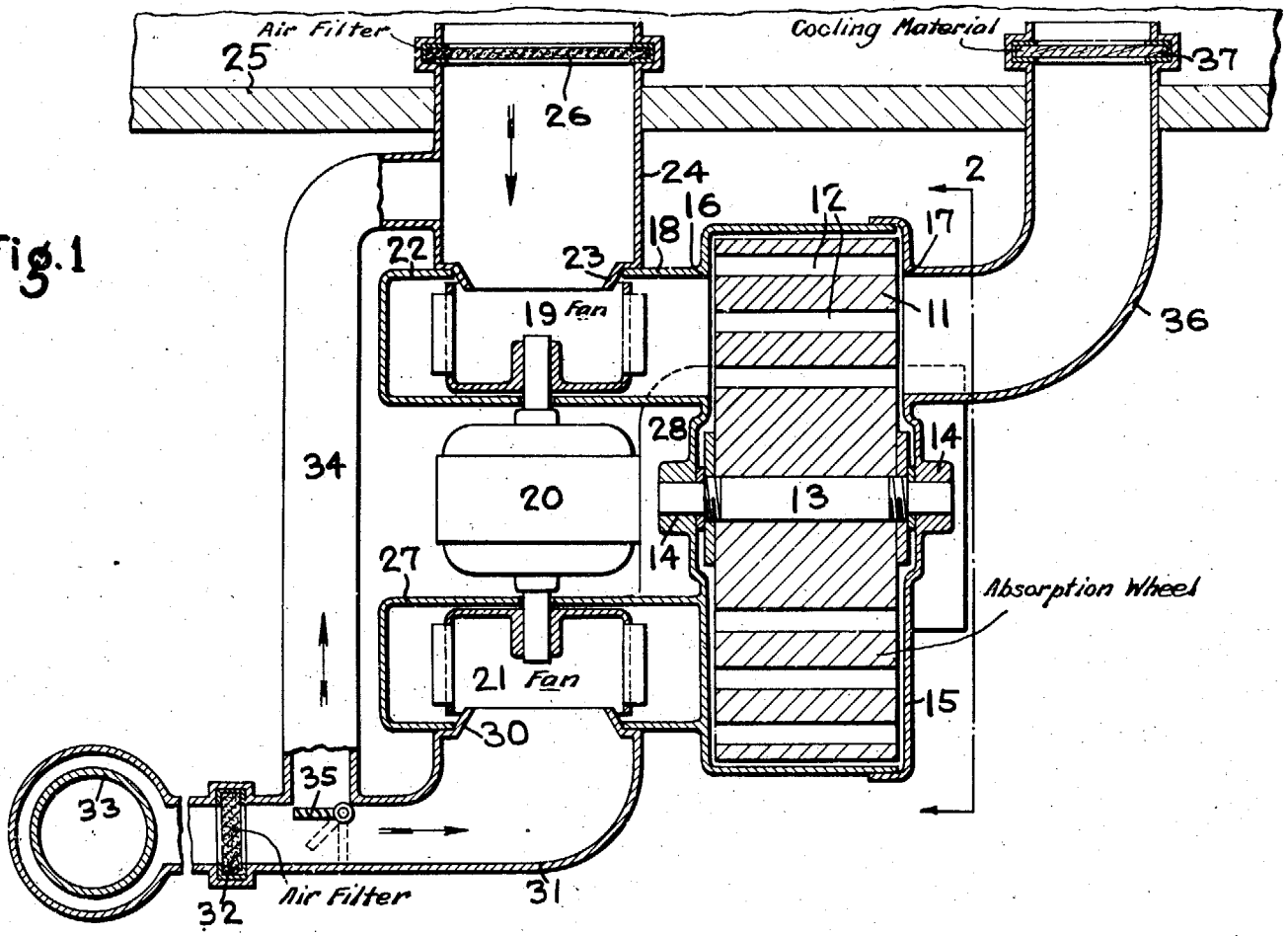
Figure 1 is a diagrammatic view, partly in section, of an air conditioning system embodying the present invention.

Referring to the drawings, and especially to Fig. 1, the improved air conditioning system comprises a disk or wheel 11, formed of suitable absorbing material such for instance as diatomaceous earth. The nature of which material is its insolubility in water, but adaptability to absorb several times its own weight of moisture without becoming fluid.

Figure 3:
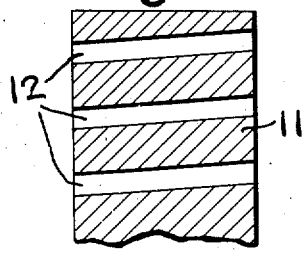
Figs. 3 and 4 are detail sections showing modified forms of the wheel used for dehumidifying the air.
Figure 4:
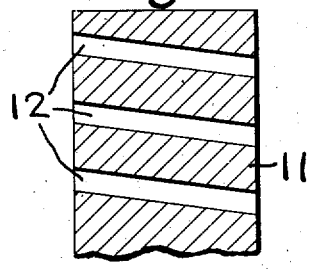

The wheel or disk 11 is performed as at 12. The said perforations 12 may, as shown in Fig. 1, be formed parallel to the axis of the wheel, or if so desired, said perforations may, as shown in Figs. 3 and 4, extend through the wheel at an angle to the axis thereof, for a purpose to be hereinafter more fully described.

Extending through the wheel 11, is a shaft 13. The ends of the shafts 12 are journalled in bearings 14, carried by a suitable casing 15.

The casing 15 conforms generally to the body of the wheel 11, and entirely encloses the same for a purpose to be hereinafter described.

Figure 2:
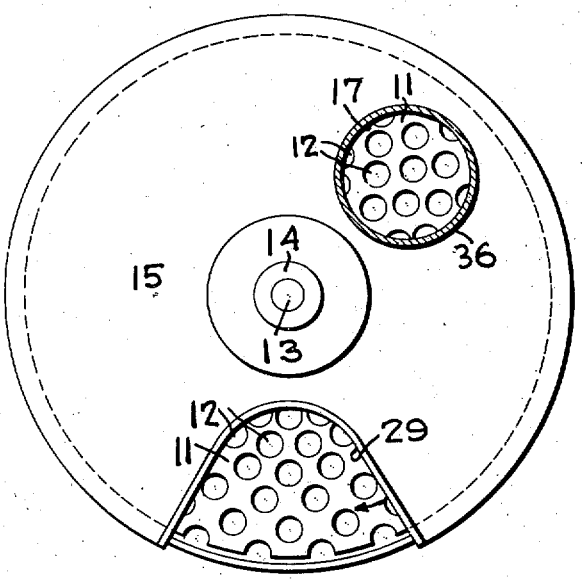
Fig. 2 is a vertical section taken along the line 2—2 of Fig. 1, looking at one end of the apparatus.

One wall of the casing 15 is formed with an opening 16, and at a diametric point the opposite wall of said casing is formed with an opening 17. The openings 16 and 17 are disposed, as shown in Fig. 2, at a point above the horizontal axis of the wheel 11 for a purpose to be hereinafter more fully described.

Connected to the opening 16 is one end of a conduit 18 of a blower or fan 19. The blower or fan 19 is driven by an electric motor 20.

Also driven by the motor 20 is a second blower or fan 21 which is disposed on the opposite side of the motor to the blower or fan 19.

The blower or fan 19 is mounted in a casing 22 having an inlet opening 23 formed therein. The inlet opening 23 is connected to a chamber or other compartment by means of a conduit 24, which extends through the wall 25 of the chamber or compartment. If so desired, the inner end of the conduit 24 may have a filter 26 mounted therein for cleaning the air drawn from the compartment or chamber by the blower or fan 19.

The blower or fan 21 has a casing 27 which is connected at one end to the casing 15 of the wheel 11 by a conduit 28.

Directly below the axis of the wheel 11 the outer wall of the wheel casing 15 is formed with an opening 29 which is, as shown in Fig. 2, greater in area than the opening 17 heretofore referred to, and said opening 29 is located in the outside wall of the casing 15 at a point opposite to the connection of the conduit 28 with the wall of the casing on the inner side of the wheel 11, the inner end of the conduit 28 conforming in shape and area substantially to the opening 29 shown in Fig. 2.

The casing 27 of blow or fan 21 is formed with an inlet opening 30. Connected to the inlet opening 30 is a conduit 31 having a filter 32 mounted therein as shown in Fig. 1.

Preferably the conduit 31 leads from a source of heat which may, in the present instance, be a pipe 33, said conduit encircling the pipe 33 as shown.

Conduit 31 is connected to conduit 24, heretofore referred to, by a conduit 34. At the point where conduit 34 is joned to conduit 31 there is a damper or valve device 35, which is adapted to divert air flowing through conduit 31 into conduit 34, so that heated air in conduit 31 will be conducted to the blower or fan 19, for a purpose to be hereinafter more fully described.

Leading from opening 17 in the wheel casing 15 is a conduit 36 which extends through the wall 25 of the chamber or compartment. The conduit 36 terminates a suitable distance inside of the chamber or compartment, and if so desired has mounted therein a receptacle 37 for a suitable cooling agent or cooling material.

In operation, through the action of motor 20 the blowers or fans 19 and 21 are rotated at a suitable speed. Through the operation of blower 19 air to be conditioned is withdrawn from the chamber or compartment through the conduit 24 and forced through the perforations 12 in the wheel 11. The air is then returned to the chamber or compartment by conduit 36 leading from the outer side of the wheel casing 15.

The perforations 12 through the wheel 11 are so arranged as to present the greatest surface area to the wiping action of the air passing through the wheel to thereby extract moisture from the air as delivered by the fan 19 at the opening 16 in the casing 15 of the wheel.

In some cases it may be desirable to construct the wheel 11 with the perforations 12 extending through said wheel at an angle to the rotating axis thereof, as shown in Figs. 3 and 4. In this way a greater surface area is presented to the wiping action of the air which passes through the wheel, with the result that the rotary movement of the wheel will be accelerated.

The weight of the added moisture to the portion of the wheel 11 as the air passes through the wheel from opening 16 to opening 17, acts as a counterweight and causes the wheel to rotate in a clockwise direction, as shown by the arrow in Fig. 2.

The blower or fan 21 delivers hot air to the wheel 11 through conduit 28 which is located at the bottom of the housing 15 as has been heretofore described. The hot air, in passing through the moisture wet wheel 11, evaporates the moisture absorbed by said wheel and dries the wheel. This removal of moisture, in turn, lightens the lowermost area of the wheel between the point at which the conduit 28 is connected to the wheel casing 15 and the opening 29, and thereby permits the accumulated moisture in the portion of the wheel between the openings 16 and 17 to exert an overbalancing effect upon the wheel 11 and thereby cause said wheel to rotate.

The portion of the wheel 11 from the opening 29 in a clockwise direction (Fig. 2) to the opening 17 is the dryest portion of the wheel and consequently the lighter part, while the portion or area of the wheel from the opening 17 to the opening 29 is the area or portion containing the greatest amount of moisture and consequently this part of the wheel 11 has an overbalancing effect thereon. And in order that the air to be dehumidified will pass through the wheeel 11, the casing 15 should be so formed as to enclose the wheel as closely as possible, there being only sufficient clearance between the casing and the wheel to permit free unrestricted rotation of the wheel in the casing.

This continuous cycle of operation constantly causes the dry area of the wheel to move past the air stream entering the wheel through the opening 16 and at the same time the drying action of the heat being supplied at the bottom of the wheel through the action of blower 21 is continued. This is a new principle of inherent automatic action instead of applied control or action which would be produced by positively rotating the wheel 11 by mechanical means, such as a motor or the like.

In the above description of the operation of the device, it was assumed that the by-pass damper 35 is in position to cut off communication between conduits 31 and 34. The purpose of the damper 35 is to control the amount of heat flowing through the conduit 34 so that during cold weather heated air can be directed through conduit 34 to conduit 24 and, through the action of blower 19, be forced into the chamber or compartment behind the wall 25 so that said chamber or compartment will be heated by the conditioned air.

On the other hand, if it is desired to cool the air delivered to the chamber or compartment by conduit 36, said conduit may have means mounted therein at the point 37 for chilling the air entering the chamber or compartment. Such air chilling means may be in the form of a block of carbon dioxide, or any other suitable material which will lower the temperature of the conditioned air.

The above air conditioning system has been particularly designed for use in automobiles, busses, trucks and other transport vehicles, and when so used the apparatus can be mounted on the motor side of the dash board of a vehicle, that is to say, under the hood of a vehicle. In this case, the wall 25 constitutes the dash board of the vehicle and the conduits 24 and 36 terminate within the body of the vehicle at a point adjacent to the space therein between the instrument board and the dash board as will be understood.

The cycle which has been herein shown is primarily that cycle which is known as the cooling cycle. For winter or cold weather use, it is desirable, usually, to add moisture to the air, thereby increasing its relative humidity to a balanced condition compatible with the temperature differential between the outside air and the heated conditioned air. In consequence of which I propose to subject the disk or wheel 11 to a spray or drip of water directly over the opening 17, so that the wheel will be sufficiently wet that the heated air passing through the wheel in circulation will absorb moisture from the wheel instead of the wheel absorbing moisture from the heated air.

The periphery of the casing 15 between the openings 29 and 17, in a clockwise direction (Fig. 2), is subjected to a current of air to dispel by convection the heat which the wheel 11 may have absorbed between the points 28 and 29 in the drying cycle.

Since the device is very compact and light in weight it can be cheaply manufactured and can be easily adapted for the above purpose to provide a positive circulation of conditioned air within the body of a vehicle.

When the device is installed in a vehicle, as above referred to, the conduit 31 can be connected to the exhaust pipe of the engine of the vehicle, said exhaust pipe being indicated at 33.

On the other hand, larger devices can be constructed for installation on railroad cars or in rooms of buildings. However, the primary purpose of the invention is to provide an inexpensive air conditioning system for motor vehicles, which can be used throughout the entire year to supply conditioned air, that is, heated and humidified or dehumidified air in cold weather, and chilled or cooled dehumidified air in extremely hot weather, to the interior of the body of a vehicle.

Changes may be made in the details of construction and in the arrangement of the parts above described within certain limits without departing from the spirit of the invention.

Having thus described my invention, what I claims is:

1. Air conditioning apparatus of the type described comprising a rotary absorber wheel, a casing enclosing said wheel, openings formed in the wheel casing on opposite sides thereof, said openings being located at a point above and offset to the axis of said wheel, a blower having a conduit for conducting air to be conditioned to said wheel casing, said blower conduit being connected to one of said openings on one side of said casing, a conduit connected to the other opening for conducting conditioned air away from the apparatus, a second blower, a conduit leading from a source of heat to said second blower, a conduit connecting said heat conduit with the conduit conducting air to be conditioned to said first blower, means for controlling the amount of heated air admitted to said connecting conduit, a conduit connecting said second blower with said wheel casing at a point spaced from said first named openings, an opening formed in the wall of said wheel casing opposite to the point of attachment of said second blower conduit for discharging the air delivered to said wheel casing by said second blower, and a single means for simultaneously operating both of said blowers.

2. An air dehumidifying apparatus comprising a perforated wheel composed of anhydrous material, a casing enclosing said wheel, means for freely mounting said wheel for rotation in said casing, means for passing air to be dehumidified through a restricted portion of said wheel above the axis of the wheel, and means for passing a current of heated air through a portion of said wheel offset with respect to said first named portion and located below the axis of the wheel to remove the moisture from the wheel and lighten a restricted portion of the wheel, so that said wheel is rotated by the downward motion imparted by the overweighted saturated portion of the wheel.

3. Continuous absorption apparatus comprising a freely rotatably mounted perforated wheel formed of anhydrous material, a casing enclosing said wheel, means for passing humid air through a restricted portion of the wheel at a point above the axis of the wheel, and means for removing moisture from the wheel at a point below the axis of said wheel, whereby the saturated portion of the wheel overbalances the dewatered portion thereof, thereby permitting the weighted portion of the wheel to move downwardly and effect automatic rotation of the wheel.

4. An air dehumidifying apparatus comprising a wheel formed of anhydrous material, means for rotatably supporting said wheel whereby the same is free to rotate when it is overbalanced, means for passing air to be dehumidified through a restricted portion of the wheel above the center thereof whereby a limited area of said wheel is saturated with moisture, and means for passing a current of heated air through a restricted portion of the wheel below the center of said wheel so as to remove moisture from the lower portion of the wheel and permit the saturated portion above the center of the wheel to overbalance the dewatered portion below the center of the wheel and thereby cause said wheel to rotate.

5. Air conditioning apparatus of the type described comprising an absorber wheel adapted to rotate solely by gravity, a casing enclosing said wheel and constituting means for freely rotatably supporting said wheel, a pair of alined openings formed in said casing at a point offset with and above the axis of rotation of said wheel, a blower having a conduit for conducting moisture-laden air to be conditioned to said wheel, said blower conduit being connected to the opening on one side of said casing whereby moisture-laden air is delivered to said wheel, a conduit connected to the opening on the opposite side of said casing for conducting dewatered air away from the apparatus, a second pair of alined openings formed in said casing at a point below the axis of rotation of said wheel, a second blower, a conduit leading from a source of heat to said second blower, and a conduit connecting said second blower with the lower opening on one side of the casing for conducting heated air to said wheel for the purpose of unwatering said wheel whereby the lower sector of the wheel is lightened to permit the wheel to rotate by gravity under the downward forces exerted by the upper saturated portion of the wheel.

6. An air dehumidifying apparatus comprising a wheel formed of moisture absorbing material, a casing enclosing said wheel, means for freely mounting said wheel for rotation in said casing, means for passing air to be dehumidified through a restricted portion of said wheel above the axis of the wheel, and means for passing another current of air through a portion of said wheel offset with respect to said first-named portion and located below the axis of the wheel to remove moisture from the wheel and lighten a restricted portion of the wheel, so that said wheel is rotated by the downward motion imparted by the overweighted saturated portion of the wheel.

7. An air dehumidifying apparatus comprising a wheel composed of anhydrous material, a casing enclosing said wheel, means for freely mounting said wheel for rotation in said casing, means for passing air to be dehumidified through a restricted portion of said wheel at one side of a vertical plane intersecting the axis of the wheel, and means for passing a current of heated air through a portion of said wheel spaced below said first-named portion and located on the same side of said vertical plane to remove the moisture from the wheel and lighten a restricted portion of the wheel, so that said wheel is rotated by the downward motion imparted by the overweighted saturated portion of the wheel.

8. An air dehumidifying apparatus comprising a wheel formed of moisture absorbing material, a casing enclosing said wheel, means for freely mounting said wheel for rotation in said casing, means for passing air to be dehumidified through a restricted portion of said wheel at one side of a vertical plane intersecting the axis of said wheel, and means for passing another current of air through a portion of said wheel spaced below said first-named portion to remove moisture from the wheel and lighten a restricted portion of the wheel, so that said wheel is rotated by the downward motion imparted by the overweighted saturated portion of the wheel.

ROGER S. KOPP.